(12) United States Patent
Chang (10) Patent No.: US 10,110,044 B2
(45) Date of Patent: Oct. 23, 2018

(54) WIRELESS CHARGING MOUSE, WIRELESS INPUT APPARATUS AND INPUT METHOD

(71) Applicants: DEXIN ELECTRONIC LTD., Donggaun, Guangdong (CN); DEXIN CORPORATION, New Taipei (TW)

(72) Inventor: Yuan-Jung Chang, New Taipei (TW)

(73) Assignees: DEXIN ELECTRONIC LTD., Dongguan, Guangdong (CN); DEXIN CORPORATION, New Taipei (TW)

(*) Notice: Subject to any disclaimer, the term of this patent is extended or adjusted under 35 U.S.C. 154(b) by 142 days.

(21) Appl. No.: 15/152,272

(22) Filed: May 11, 2016

(65) Prior Publication Data

US 2017/0331313 A1    Nov. 16, 2017

(51) Int. Cl.
| | |
|---|---|
| G09G 5/08 | (2006.01) |
| H02J 7/02 | (2016.01) |
| H02J 50/12 | (2016.01) |
| H02J 50/90 | (2016.01) |
| G06F 3/0354 | (2013.01) |
| G06F 3/039 | (2013.01) |

(52) U.S. Cl.
CPC .............. *H02J 7/025* (2013.01); *G06F 3/039* (2013.01); *G06F 3/03543* (2013.01); *H02J 50/12* (2016.02); *H02J 50/90* (2016.02); *G06F 2203/0384* (2013.01)

(58) Field of Classification Search
CPC .................. G06F 3/033; G06F 3/0354; G06F 2200/1637; G06F 3/0346; G06F 1/3259; G06F 3/0317; G06F 3/03541; G06F 3/03543; G06F 1/1632; G06F 1/1626; H02J 50/90; H02J 50/12; H04N 2007/145
USPC ........................................ 345/156–158, 163
See application file for complete search history.

(56) References Cited

U.S. PATENT DOCUMENTS

| | | | |
|---|---|---|---|
| 2004/0189246 A1* | 9/2004 | Bulai .................. | G06F 3/03543 320/108 |
| 2005/0264534 A1* | 12/2005 | Lee ........................ | G06F 1/3215 345/166 |
| 2007/0097078 A1* | 5/2007 | Chin ..................... | G06F 3/0317 345/166 |

(Continued)

*Primary Examiner* — Jennifer Nguyen
(74) *Attorney, Agent, or Firm* — Li & Cai Intellectual Property (USA) Office (57) ABSTRACT

Disclosed is a wireless charging mouse, comprising a wireless power receiving circuit, a wireless radiating circuit, a displacement detecting circuit and a control circuit. The control circuit is electrically connected to the wireless power receiving circuit, the wireless radiating circuit and the displacement detecting circuit. The wireless power receiving circuit wirelessly receives electromagnetic energy from a charging board. The displacement detecting circuit detects the displacement of the wireless charging mouse. The control circuit receives the electromagnetic energy from the wireless power receiving circuit, and outputs a displacement detecting signal to a wireless receiver through the wireless radiating circuit according to the detected displacement obtained from the displacement detecting circuit. When the electromagnetic energy received by the wireless charging mouse is less than a predetermined electromagnetic energy, the control circuit stops outputting the displacement detecting signal to the wireless receiver.

13 Claims, 5 Drawing Sheets

(56) References Cited

U.S. PATENT DOCUMENTS

| | | | |
|---|---|---|---|
| 2010/0039066 A1* | 2/2010 | Yuan | H02J 50/12 |
| | | | 320/108 |
| 2011/0175567 A1* | 7/2011 | Kidakarn | G06F 1/266 |
| | | | 320/108 |
| 2011/0310018 A1* | 12/2011 | Song | G06F 3/0312 |
| | | | 345/166 |
| 2016/0085322 A1* | 3/2016 | Park | G06F 1/266 |
| | | | 345/163 |

\* cited by examiner

WIRELESS CHARGING MOUSE, WIRELESS INPUT APPARATUS AND INPUT METHOD

BACKGROUND OF THE INVENTION

1. Field of the Invention

The instant disclosure relates to a wireless mouse; in particular, to a wireless charging mouse.

2. Description of Related Art

With the development of technology, the personal computer, laptop, tablet and portable electric devices have become essential for our daily lives. There are many input devices for the above electric products, such as the mouse, keyboard or the like. The mouse is a common input device for controlling the cursor displayed on the screen of the electric device. Initially, a roller is configured inside the mouse, and when a user moves the mouse on the desk the roller is rolling. By mechanically detecting displacement of the roller, the movement of the cursor displayed on screen can be correspondingly calculated. However, recently, the traditional mechanic mouse has been gradually replaced by the optical mouse, which detects the displacement of the mouse based on optical principles and a better detection accuracy of the mouse is provided.

SUMMARY OF THE INVENTION

The instant disclosure provides a wireless charging mouse. The wireless charging mouse comprises a wireless power receiving circuit, a wireless radiating circuit, a displacement detecting circuit and a control circuit. The wireless power receiving circuit wirelessly receives an electromagnetic energy from a charging board. The displacement detecting circuit detects the displacement of the wireless charging mouse. The control circuit is electrically connected to the wireless power receiving circuit and the displacement detecting circuit. The control circuit receives the electromagnetic energy from the wireless power receiving circuit, and outputs a displacement detecting signal to a wireless receiver through the wireless radiating circuit according to the detected displacement. When the electromagnetic energy received by the wireless charging mouse is less than a predetermined electromagnetic energy, the control circuit stops outputting the displacement detecting signal to the wireless receiver.

The instant disclosure further provides a wireless input device, and the wireless input device comprises a charging board and a wireless charging mouse. The wireless charging mouse comprises a wireless power receiving circuit, a wireless radiating circuit, a displacement detecting circuit and a control circuit. The wireless power receiving circuit wirelessly receives electromagnetic energy from the charging board. The displacement detecting circuit detects the displacement of the wireless charging mouse. The control circuit is electrically connected to the wireless power receiving circuit and the displacement detecting circuit. The control circuit receives the electromagnetic energy from the wireless power receiving circuit, and outputs a displacement detecting signal to a wireless receiver according to the detected displacement obtained from the displacement detecting circuit. When the control circuit determines that the wireless charging mouse is not in contact with the charging board according to the electromagnetic energy received from the wireless power receiving circuit, the control circuit stops outputting the displacement detecting signal to the wireless receiver. When the control circuit determines that the wireless charging mouse is in contact with the charging board according to the electromagnetic energy received from the wireless power receiving circuit, the control circuit outputs the displacement detecting signal to the wireless receiver.

The instant disclosure further provides an inputting method of a wireless charging mouse. The input method comprises: receiving electromagnetic energy by the wireless charging mouse from a charging board; and stopping outputting a displacement detecting signal to a wireless receiver by the wireless charging mouse when the electromagnetic energy received by the wireless charging mouse is less than a predetermined electromagnetic energy.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
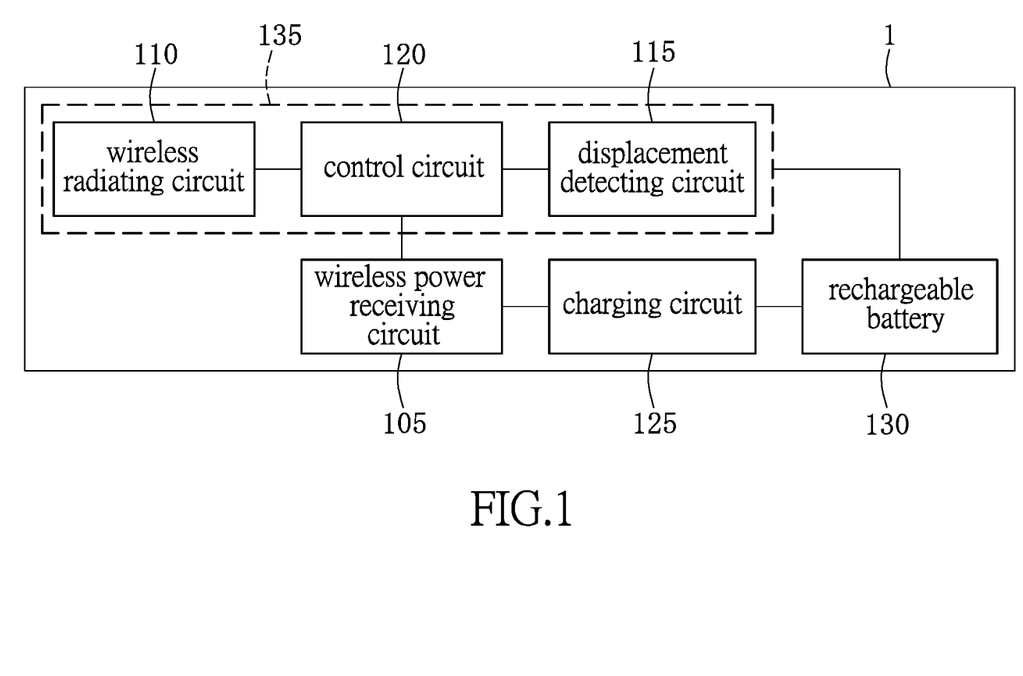
FIG. 1 shows a circuit block diagram of a wireless charging mouse of one embodiment of the instant disclosure.

Refer to FIG. 1. FIG. 1 shows a circuit block diagram of a wireless charging mouse of one embodiment of the instant disclosure. The wireless charging mouse 1 comprises a wireless power receiving circuit 105, a charging circuit 125, a rechargeable battery 130 and an operating circuit 135. The operating circuit 135 comprises a wireless radiating circuit 110, a displacement detecting circuit 115 and a control circuit 120. The control circuit 120 is electrically connected to the wireless power receiving circuit 105, the wireless radiating circuit 110 and the displacement detecting circuit 115. The operating circuit 135 is electrically connected to the rechargeable battery 130 to receive an electric power. The control circuit 120 also can transmit or receive a signal through the wireless power receiving circuit 105, the wireless radiating circuit 110 and the displacement detecting circuit 115.

The wireless power receiving circuit 105 comprises a resonance circuit and a magnetic coil. The power transmission of the resonance wireless charging is rather efficient. A resonant magnetic coupling is formed as long as the electromagnetic energy transmitting end and the electromagnetic energy receiving end have the same resonance frequency. Specifically, when an electromagnetic coupling is formed between a magnetic coil of the wireless power receiving circuit 105 and a magnetic coil of the wireless radiating circuit 110 of the charging board, the wireless charging mouse 1 can wirelessly receive an electromagnetic energy from the charging board. In this embodiment, the wireless power receiving circuit 105 is electrically connected to the charging circuit 125. The charging circuit 125 has a filtering function and a rectifying function. The electromagnetic energy received by the wireless power receiving circuit 105 is filtered and rectified by the charging circuit 125, and the filtered and rectified electromagnetic energy is transmitted to the rechargeable battery 130 as a stored power. The rechargeable battery 130 supplies power to the wireless radiating circuit 110, the displacement detecting circuit 115 and the control circuit 120 of the operating circuit 135.

The displacement detecting circuit 115 detects the displacement of the wireless charging mouse 1. Specifically, the displacement detecting circuit 115 can determine the direction and the displacement of the wireless charging mouse 1 by an optical detection, but it is not limited herein. A light source unit (not shown) of the displacement detecting circuit 115 can emit, for example, a laser or an infrared (IR) ray onto a plane. A reception unit (not shown) of the displacement detecting circuit 115 can receive the laser or the IR ray reflected by the plane. The direction and the displacement of the wireless charging mouse 1 can be calculated according to the difference between the incident light and the reflected light.

The control circuit 120 correspondingly generates a displacement detecting signal according to the displacement detected by the displacement detecting circuit 115. The control circuit 125 transmits the displacement detecting signal to the wireless radiating circuit 110, and the displacement detecting signal is outputted to the wireless receiver (not shown) through the wireless radiating circuit 110. The wireless receiver can be a dongle plugged into the USB port of a computer device, or the wireless receiver can be configured inside the computer device. The wireless communication type of the wireless radiating circuit 110 can be Bluetooth wireless communication or RF wireless communication.

The control circuit 120 receives the electromagnetic energy from the wireless power receiving circuit 105, and correspondingly generates a displacement detecting signal according to the displacement detected by the displacement detecting circuit 115. The control circuit 120 outputs the displacement detecting signal to the wireless receiver through the wireless radiating circuit 110. When the electromagnetic energy received by the wireless power receiving circuit 105 of the wireless charging mouse 1 is less than a predetermined electromagnetic energy, the control circuit 120 immediately stops outputting the displacement detecting signal to the wireless receiver. In detail, the electromagnetic energy received by the wireless power receiving circuit 105 of the wireless charging mouse 1 is less than the predetermined electromagnetic energy because a user has pulled up the wireless charging mouse 1 and the wireless charging mouse 1 is not in contact with the charging board. Under this situation, the control circuit 120 stops outputting the displacement detecting signal to the wireless receiver, and thus the displacement of the wireless charging mouse 1 will not be continually detected, which avoids the incorrect detection.

When the electromagnetic energy received by the wireless power receiving circuit 105 of the wireless charging mouse 1 is less than the predetermined electromagnetic energy, in order to prevent any incorrect detection made by the displacement detecting circuit 115 according to the continually outputted displacement detecting signal, the control circuit 120 stops outputting the displacement detecting signal immediately. To stop outputting the displacement detecting signal, the control circuit 120 can stop the wireless radiating circuit 110 transmitting a signal, or can stop the displacement detecting circuit 115 detecting the displacement of the wireless charging mouse 1.

In addition, the control circuit 120 may stop outputting the displacement detecting signal when a user pulls up the wireless charging mouse from the charging board for only a short time, or when the electromagnetic energy transmitted to the wireless charging mouse 1 from the charging board varies within a short time, but the control circuit 120 only stops outputting the displacement detecting signal if the electromagnetic energy received by the wireless power receiving circuit 105 of the wireless charging mouse 1 has been less than the predetermined electromagnetic energy over a predetermined time. For example, if the electromagnetic energy received by the wireless power receiving circuit 105 of the wireless charging mouse 1 has been less than the predetermined electromagnetic energy over 10 ms, the control circuit 120 determines that the wireless charging mouse has been pulled up quite a distance away from the charging board and the control circuit 120 stops outputting the displacement detecting signal.

When the electromagnetic energy received by the wireless power receiving circuit 105 of the wireless charging mouse 1 is larger than the predetermined electromagnetic energy, the control circuit 120 outputs the displacement detecting signal to the wireless receiver through the wireless radiating circuit 110. Specifically, when the wireless charging mouse 1 is put on the charging board and a user is using it, the control circuit 120 determines that the wireless charging mouse 1 is stably receiving electromagnetic energy from the charging board, and thus the wireless radiating circuit 110 outputs the displacement detecting signal to the wireless receiver for controlling the cursor displayed on screen of the computer device.

Figure 2:
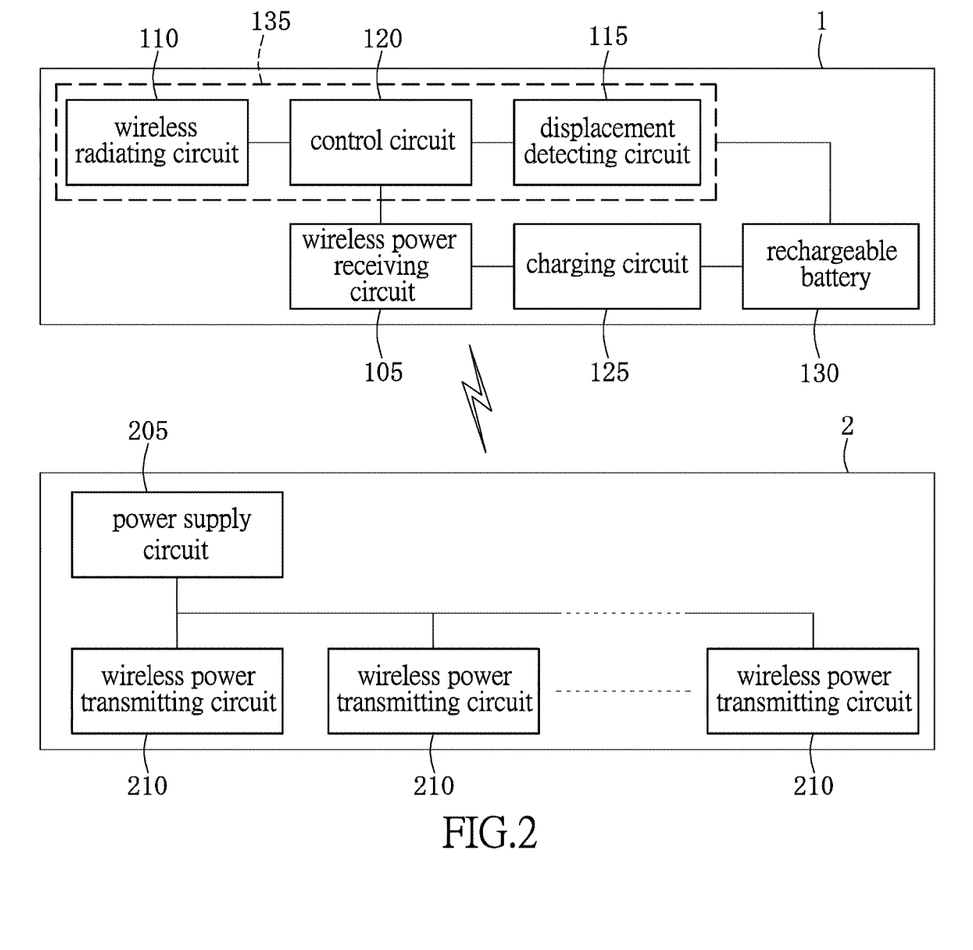
FIG. 2 shows a circuit block diagram of a wireless input device of one embodiment of the instant disclosure.

Refer to FIG. 2. FIG. 2 shows a circuit block diagram of a wireless input device of one embodiment of the instant disclosure. Compared to the embodiment shown in FIG. 1, there is a charging board 2 added in the embodiment shown in FIG. 2. The charging board 2 wirelessly transmits the electromagnetic energy to the wireless charging mouse 1. The charging board 2 comprises a power supply circuit 205 and a plurality of wireless power transmitting circuits 210, wherein each wireless power transmitting circuit 210 is electrically connected to the power supply circuit 205. Each wireless power transmitting circuit 210 comprises a resonance circuit and a magnetic coil. The power supply circuit 205 is connected to an external power through a connection terminal, such as a USB terminal. The power supply circuit 205 transmits the electromagnetic energy to the wireless charging mouse 1 through each wireless power transmitting circuit 210.

Again refer to FIG. 2. The charging board 2 comprises a plurality of wireless power transmitting circuits 210. When the wireless charging mouse 1 moves to a position between two adjacent wireless power transmitting circuits 210, the electromagnetic energy received by the wireless power receiving circuit 110 of the wireless charging mouse 1 is larger than the predetermined electromagnetic energy. The magnetic lines are three-dimensional curves. Thus, in this embodiment, the distance between any two adjacent wireless power transmitting circuits 210 makes the electromagnetic energy received by the wireless power receiving circuit 110 of the wireless charging mouse 1 larger than the predetermined electromagnetic energy, which can prevent the control circuit 120 from wrongly determining that the wireless charging mouse 1 has been pulled up a distance away from the charging board 2 when the wireless charging mouse 1 is actually put on the charging board 2 and the user is using it.

Figure 3:
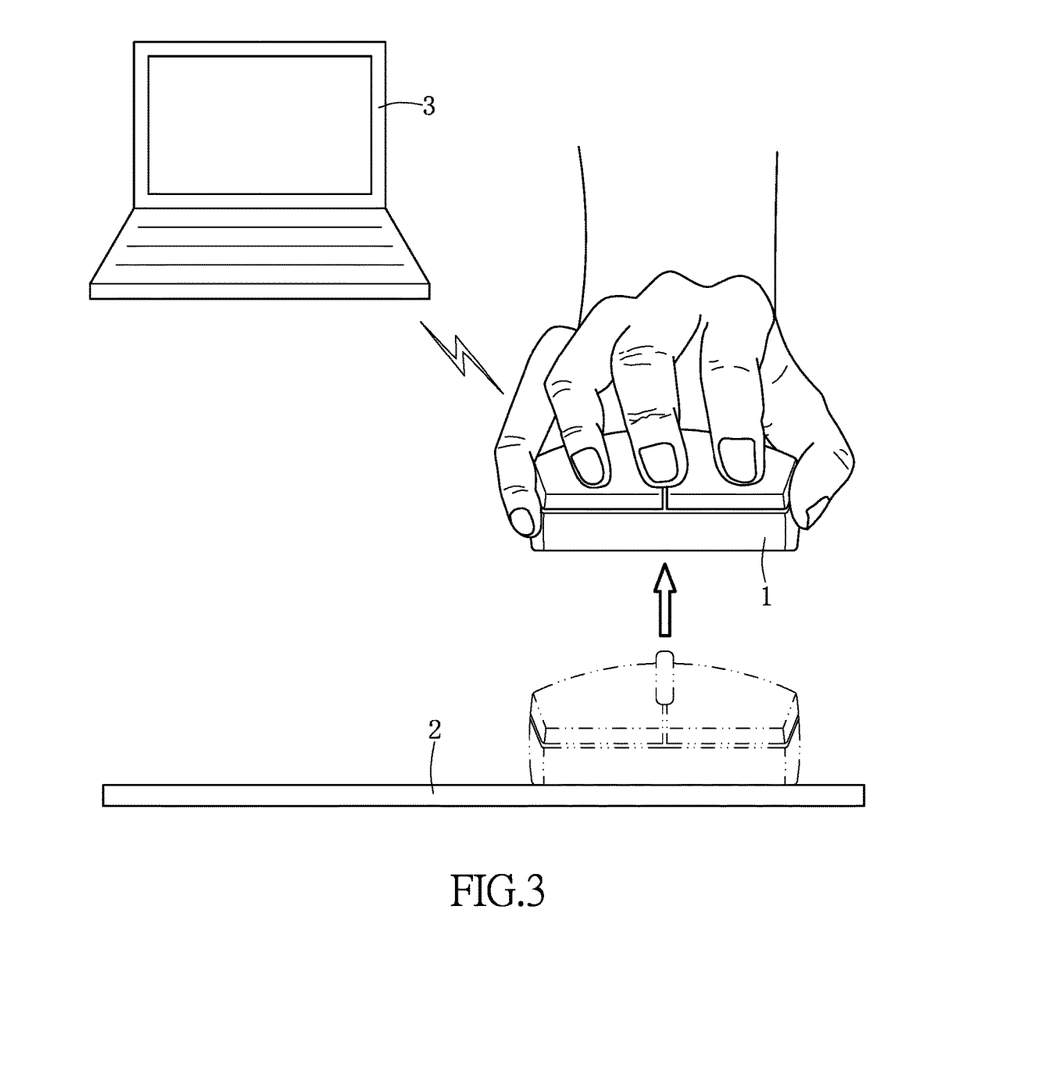
FIG. 3 shows a schematic diagram of the operation for a wireless input device of one embodiment of the instant disclosure.

In conjunction with FIG. 2, FIG. 3 shows a schematic diagram of the operation for a wireless input device of one embodiment of the instant disclosure. In this embodiment, the wireless receiver is configured inside a laptop 3. When the wireless charging mouse 1 is put on the charging board 2 and not pulled up, the control circuit 120 detects that the electromagnetic energy received by the wireless power receiving circuit 110 of the wireless charging mouse 1 is larger than the predetermined electromagnetic energy. Thus, the control circuit 120 determines that the wireless charging mouse 1 is in contact with the charging board 2, and outputs the displacement detecting signal to the wireless receiver. On the contrary, as shown in FIG. 3, when the wireless charging mouse 1 has been pulled up a distance from the charging board 2, the control circuit 120 detects that the electromagnetic energy received by the wireless power receiving circuit 110 of the wireless charging mouse 1 is less than the predetermined electromagnetic energy. Thus, the control circuit 120 determines that, the wireless charging mouse 1 is not in contact with the charging board 2, and stops outputting the displacement detecting signal to the wireless receiver of the laptop 3.

Figure 4:
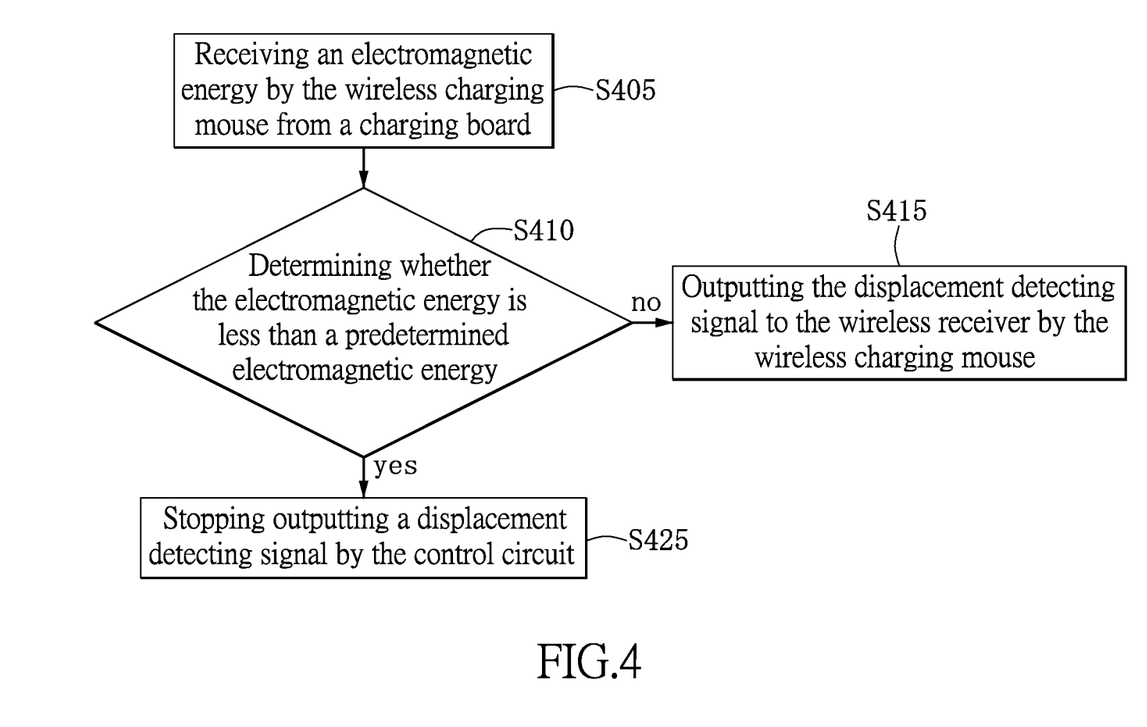
FIG. 4 shows a flow chart of an input method of a wireless charging mouse of one embodiment of the instant disclosure.

In conjunction with FIG. 2, FIG. 4 shows a flow chart of an input method of a wireless charging mouse of one embodiment of the instant disclosure. In Step S405, a wireless charging mouse receives electromagnetic energy from a charging board. When a resonant magnetic coupling is formed between one wireless power transmitting circuit of the charging board and a wireless power receiving circuit of the wireless charging mouse, the wireless power receiving circuit of the wireless charging mouse can receive the electromagnetic energy from this wireless power transmitting circuit.

In Step S410, the control circuit determines whether the electromagnetic energy received by the wireless power receiving circuit of the wireless charging mouse is less than a predetermined electromagnetic energy. If no, it goes to Step S415, but if yes, it goes to Step S425.

In Step S415, the wireless charging mouse outputs a displacement detecting signal to a wireless receiver. When the wireless charging mouse is put on the charging board and a user is using it, the electromagnetic energy received by the wireless power receiving circuit of the wireless charging mouse and detected by the control circuit is larger than the predetermined electromagnetic energy. The control circuit thus determines that the wireless charging mouse is in contact with the charging board, and outputs the displacement detecting signal to the wireless receiver.

In Step S425, the control circuit stops outputting the displacement detecting signal. For example, when the user pulls up the wireless charging mouse a distance away from the charging board, the electromagnetic energy received by the wireless power receiving circuit of the wireless charging mouse is thus less than the predetermined electromagnetic energy. Therefore, the control circuit can stop outputting the displacement detecting signal by stopping the wireless radiating circuit from transmitting a signal or by stopping the displacement detecting circuit from detecting the displacement of the wireless charging mouse.

Figure 5:
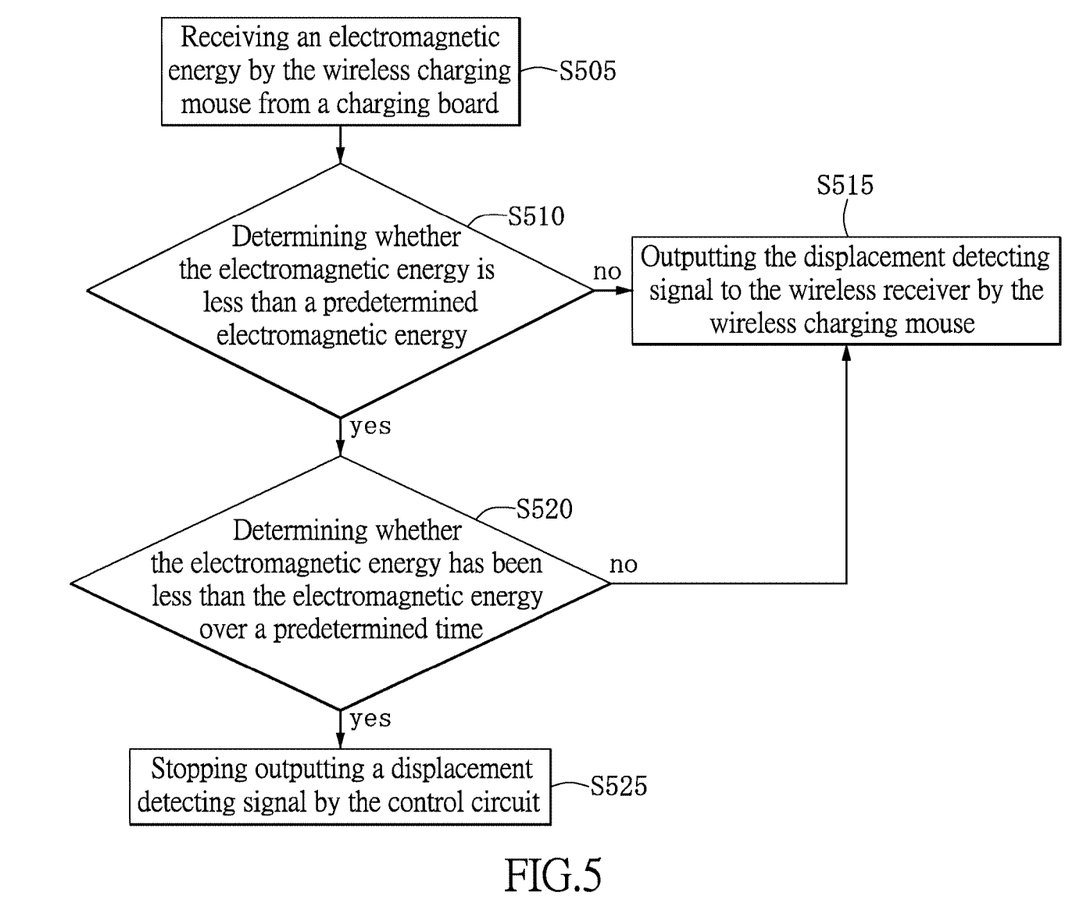
FIG. 5 shows a flow chart of an input method of a wireless charging mouse of another embodiment of the instant disclosure.

In conjunction with FIG. 2, FIG. 5 shows a flow chart of an input method of a wireless charging mouse of another embodiment of the instant disclosure. In Step S505, a wireless charging mouse receives electromagnetic energy from a charging board. When a resonant magnetic coupling is formed between one of wireless power transmitting circuits of the charging board and the wireless power receiving circuit of the wireless charging mouse, the wireless power receiving circuit of the wireless charging mouse can receive the electromagnetic energy from this wireless power transmitting circuit.

In Step S510, the control circuit determines whether the electromagnetic energy received by the wireless power receiving circuit of the wireless charging mouse is less than a predetermined electromagnetic energy. If no, it goes to Step S515, but if yes, it goes to Step S520.

In Step S515, the wireless charging mouse outputs a displacement detecting signal to a wireless receiver. When the wireless charging mouse has been put on the charging board and a user is using it, the electromagnetic energy received by the wireless power receiving circuit of the wireless charging mouse and detected by the control circuit is larger than the predetermined electromagnetic energy. Thus, the control circuit determines that the wireless charging mouse is in contact with the charging board, and outputs the displacement detecting signal to the wireless receiver.

In Step S520, the control circuit determines whether the electromagnetic energy received by the wireless power receiving circuit of the wireless charging mouse has been less than a predetermined electromagnetic energy over a predetermined time. If yes, it goes to Step S525. If no, it returns to Step S515, and the displacement detecting signal is continually outputted to the wireless receiver. Step S510 and Step S520 prevent the situation that the control circuit may stop outputting the displacement detecting signal when a user pulls up the wireless charging mouse from the charging board for only a short time, or when the electromagnetic energy transmitted to the wireless charging mouse from the charging board varies within a short time.

In Step S525, the control circuit stops outputting the displacement detecting signal. For example, when a user pulls up the wireless charging mouse a distance away from the charging board, the electromagnetic energy received by the wireless power receiving circuit of the wireless charging mouse is less than a predetermined electromagnetic energy. Thus, the control circuit can stop outputting the displacement detecting signal by stopping the wireless radiating circuit transmitting a signal or by stopping the displacement detecting circuit detecting the displacement of the wireless charging mouse.

To sum up, the control circuit of the wireless charging mouse provided by the instant disclosure can determine whether the electromagnetic energy received by the wireless power receiving circuit of the wireless charging mouse is less than a predetermined electromagnetic energy. If the electromagnetic energy received by the wireless power receiving circuit of the wireless charging mouse is less than a predetermined electromagnetic energy, the control circuit determines that the wireless charging mouse may not be in contact with the charging board, and thus stops wirelessly outputting the displacement detecting signal to the wireless receiver, or thus stops the displacement detecting circuit from detecting the displacement of the wireless charging mouse. The instant disclosure prevents the incorrect determination that may be made by the control circuit when a user has pulled up the wireless charging mouse from the charging board for only a short time, or when the electromagnetic energy transmitted to the wireless charging mouse from the charging board varies within a short time, which thus increases the detection accuracy for the wireless charging mouse.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A wireless charging mouse, comprising:
a wireless power receiving circuit, wirelessly receiving an electromagnetic energy from a charging board;
a wireless radiating circuit;
a displacement detecting circuit, detecting the displacement of the wireless charging mouse;
a control circuit, electrically connected to the wireless power receiving circuit and the displacement detecting circuit, the control circuit receiving the electromagnetic energy from the wireless power receiving circuit, outputting a displacement detecting signal to a wireless receiver through the wireless radiating circuit according to the detected displacement;
a rechargeable battery; and
a charging circuit, electrically connected to the wireless power receiving circuit and the rechargeable battery, the rechargeable battery receiving the electromagnetic energy and charging the rechargeable battery by the electromagnetic energy;
wherein when the electromagnetic energy received by the wireless charging mouse is less than a predetermined electromagnetic energy, the control circuit stops outputting the displacement detecting signal to the wireless receiver;
wherein the rechargeable battery supplies power to the wireless radiating circuit, the displacement detecting circuit and the control circuit;
wherein if the electromagnetic energy received by the wireless charging mouse has been less than the predetermined electromagnetic energy over a predetermined time, the control circuit stops outputting the displacement detecting signal to the wireless receiver.

2. The wireless charging mouse according to claim 1, wherein the control circuit stops outputting the displacement detecting signal by stopping the wireless radiating circuit transmitting a signal.

3. The wireless charging mouse according to claim 1, wherein the control circuit stops outputting the displacement detecting signal by stopping the displacement detecting circuit detecting the displacement of the wireless charging mouse.

4. The wireless charging mouse according to claim 1, wherein when the electromagnetic energy received by the wireless charging mouse is larger than the predetermined electromagnetic energy, the control circuit outputs the displacement detecting signal to the wireless receiver through the wireless radiating circuit.

5. A wireless input device, comprising:
a charging board; and
a wireless charging mouse, comprising:
a wireless power receiving circuit, wirelessly receiving an electromagnetic energy from the charging board;
a wireless radiating circuit;
a displacement detecting circuit, detecting the displacement of the wireless charging mouse;
a control circuit, electrically connected to the wireless power receiving circuit and the displacement detecting circuit, receiving the electromagnetic energy from the wireless power receiving circuit, outputting a displacement detecting signal to a wireless receiver according to the detected displacement obtained from the displacement detecting circuit;
a rechargeable battery; and
a charging circuit, electrically connected to the wireless power receiving circuit and the rechargeable battery, the rechargeable battery receiving the electromagnetic energy and charging the rechargeable battery by the electromagnetic energy;
wherein when the control circuit determines that the wireless charging mouse is not in contact with the charging board according to the electromagnetic energy received from the wireless power receiving circuit, the control circuit stops outputting the displacement detecting signal to the wireless receiver, and when the control circuit determines that the wireless charging mouse is in contact with the charging board according to the electromagnetic energy received from the wireless power receiving circuit, the control circuit outputs the displacement detecting signal to the wireless receiver;
wherein the rechargeable battery supplies power to the wireless radiating circuit, the displacement detecting circuit and the control circuit;
wherein if the electromagnetic energy received by the wireless charging mouse has been less than a predetermined electromagnetic energy over a predetermined time, the control circuit stops outputting the displacement detecting signal to the wireless receiver.

6. The wireless input device according to claim 5, wherein when the electromagnetic energy received by the wireless power receiving circuit is less than the predetermined electromagnetic energy, the control circuit determines that the wireless charging mouse is not in contact with the charging board, and when the electromagnetic energy received by the wireless power receiving circuit is larger than the predetermined electromagnetic energy, the control circuit determines that the wireless charging mouse is in contact with the charging board.

7. The wireless input device according to claim 6, wherein the control circuit stops outputting the displacement detecting signal by stopping the wireless radiating circuit transmitting a signal.

8. The wireless input device according to claim 6, wherein the control circuit stops outputting the displacement detecting signal by stopping the displacement detecting circuit detecting the displacement of the wireless charging mouse.

9. The wireless input device according to claim 5, wherein the charging board comprises a plurality of wireless power transmitting circuits, and when the wireless charging mouse moves to a position between any two adjacent wireless power transmitting circuits, the electromagnetic energy received by the wireless power receiving circuit is larger than the predetermined electromagnetic energy.

10. An inputting method of a wireless charging mouse, the wireless charging mouse having a rechargeable battery, a wireless radiating circuit a displacement detecting circuit and a control circuit, the inputting method comprising:

receiving an electromagnetic energy by the wireless charging mouse from a charging board; and stopping outputting a displacement detecting signal to a wireless receiver by the wireless charging mouse when the electromagnetic energy received by the wireless charging mouse is less than a predetermined electromagnetic energy;

wherein the rechargeable battery receiving the electromagnetic energy and charging the rechargeable battery by the electromagnetic energy;

wherein the rechargeable battery supplies power to the wireless radiating circuit, the displacement detecting circuit and the control circuit;

wherein if the electromagnetic energy received by the wireless charging mouse has been less than the predetermined electromagnetic energy over a predetermined time, the wireless charging mouse stops outputting the displacement detecting signal.

11. The input method according to claim 10, further comprising:

outputting the displacement detecting signal to the wireless receiver by the wireless charging mouse when the electromagnetic energy received by the wireless charging mouse is larger than the predetermined electromagnetic energy.

12. The input method according to claim 10, wherein the wireless charging mouse stops outputting the displacement detecting signal by stopping a wireless radiating circuit of the wireless charging mouse transmitting a signal.

13. The input method according to claim 10, wherein the wireless charging mouse stops outputting the displacement detecting signal by stopping a displacement detecting circuit of the wireless charging mouse detecting the displacement of the wireless charging mouse.

* * * * *